Aug. 28, 1951 A. J. DESNOYERS 2,565,481
APPARATUS FOR MAKING DENTAL PLATES
Filed Feb. 18, 1948 2 Sheets-Sheet 1

INVENTOR.
ARCHIE DESNOYERS
BY Charles R. Fay,
ATTORNEYS.

Aug. 28, 1951 A. J. DESNOYERS 2,565,481
APPARATUS FOR MAKING DENTAL PLATES
Filed Feb. 18, 1948 2 Sheets-Sheet 2

INVENTOR.
ARCHIE DESNOYERS
BY *Charles R. Fay,*
ATTORNEYS.

Patented Aug. 28, 1951

2,565,481

UNITED STATES PATENT OFFICE 2,565,481

APPARATUS FOR MAKING DENTAL PLATES

Archie J. Desnoyers, Fitchburg, Mass.

Application February 18, 1948, Serial No. 9,246

1 Claim. (Cl. 18—5.7)

This invention relates to a new apparatus for the making of dental plates and the main object of the invention resides in the provision of a device for making such plates more quickly and inexpensively than is possible in the prior art, one of the main benefits resulting from the present invention residing in the improved properties of the plates molded from plastic material, these benefits being that the plates are non-warping and once molded as desired retain their shape indefinitely; complete lack of bubbles in the plastic plates as finished; and the lack of necessity of curing so that the plates according to the present invention are molded and finished inside of ten minutes as compared to a good curing operation in the prior art which usually lasts as long as five hours.

A further object of the invention resides in the provision of a flask for molding dental plates in a press having a pair of platens, which are heated and hold the flask tightly at the top and the bottom thereof, one of said platens having a plunger therein adapted to be manually advanced as by means of a hand wheel, said plunger being received in a cylinder in the flask whereby the plastic material to be molded has a pressure exerted thereon by means of a surplus of plastic provided in the cylinder to be compressed by the hand wheel and plunger to an extent that the resulting dental plate made in the flask is completely without bubbles and is dense to such a degree that only ten minutes curing is necessary and the plate itself is non-warping, retaining its molded shape indefinitely and adhering more closely to mouth tissue.

Other objects and advantages of the invention will appear hereinafter.

Reference is to be had to the accompanying drawings in which.

Figures 1, 2:
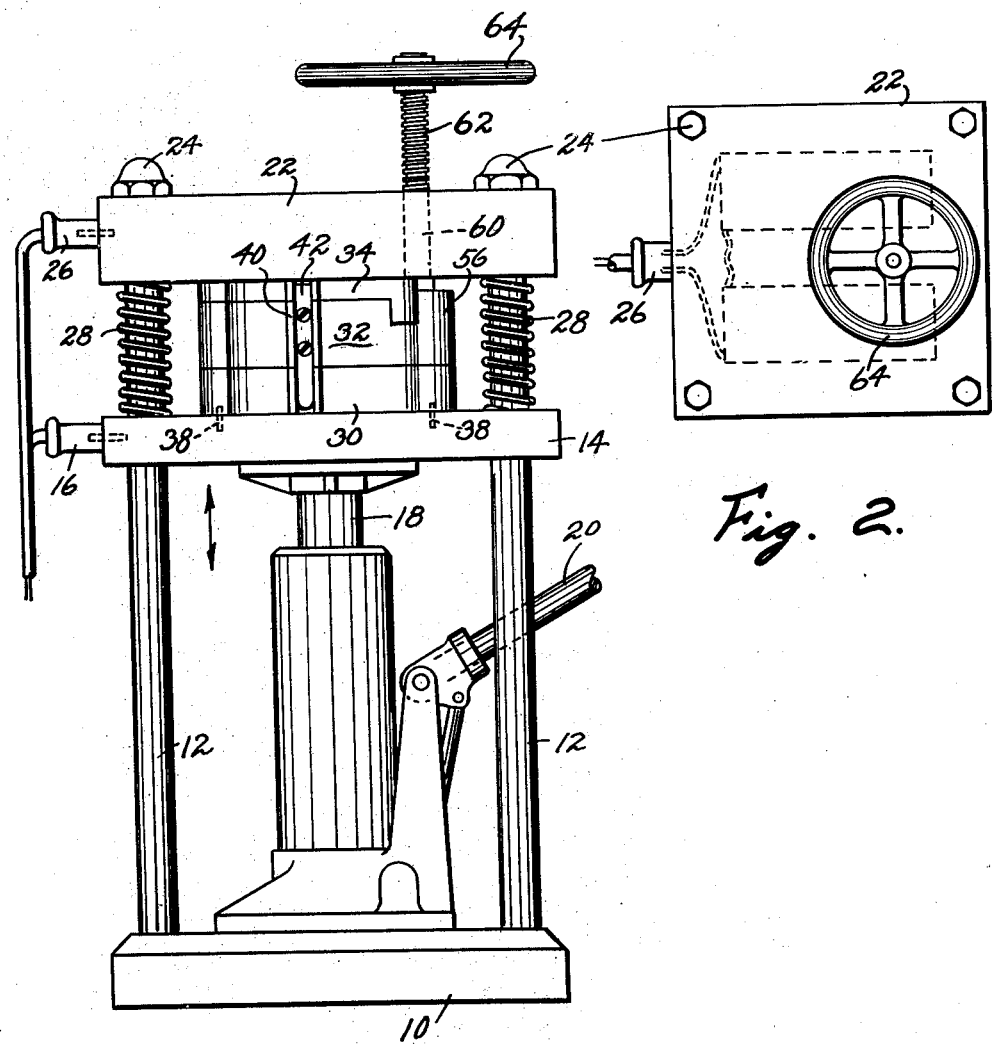
Fig. 1 is a view in elevation illustrating the invention.
Fig. 2 is a top plan view thereof.

In carrying out the invention there is provided a base 10 having four upright guide rods 12 slidably carrying a platen 14 heated by an electric element, not shown, but which is fed through an electric plug 16.

Platen 14 is adjusted and pressed upwardly by means of a jack 18 operated in the usual manner by means of a handle 20.

A top platen 22 is provided abutting nuts or the like 24 at the uppermost limitation of the rods 12. This platen is also electrically heated and is fed from a plug 26. Heavy coil springs 28 are located between the platens so as to insure non-sticking and easy separation thereof after the molding operation.

The flask itself is squeezed between the platens and comprises three main parts, a bottom member 30, a main central member 32, and a top cover member 34. The bottom member is provided with a pair of bores 36 for the reception of pins 38 in the platen 14 for the purpose of locating the flask as a whole in exactly the position required. All three of the members are provided with alining guideways 40 for the reception of an alining key 42.

Figure 4:
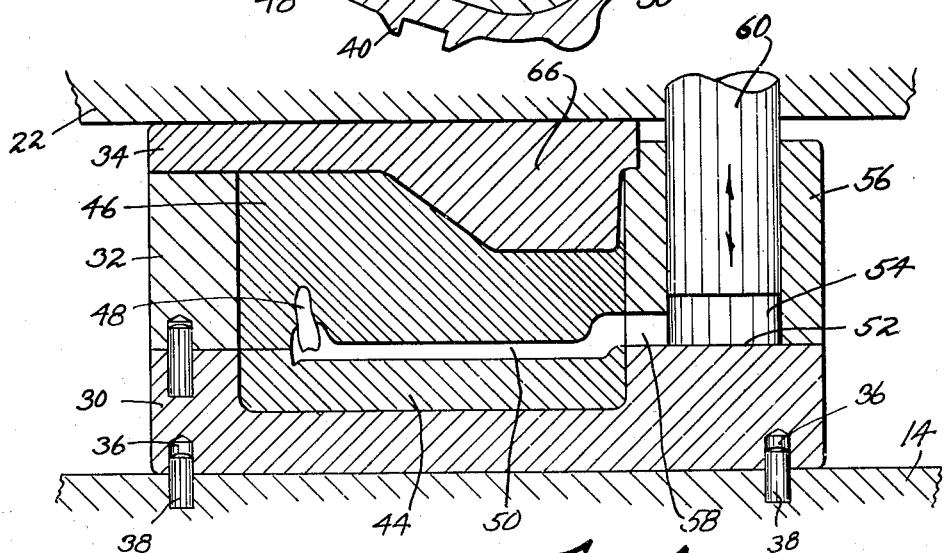
Fig. 4 is a vertical section through the flask.

As shown in Fig. 4, the molding material is located in the bottom member 30 as shown at 44 and also in the main member 32 as at 46, the teeth 48 being located in the molding material in the main member as clearly shown, the cavity 50 being formed more or less as usual as, for instance, by the "lost wax" method. In any case, it will be seen that in order to mold a plate the teeth 48 are held in the plaster or molding material 46 in desired location as will be apparent to those skilled in the art. Before closing the flask the cavity 50 is filled up with a plastic material in a state of gel, and then the flask is closed and placed between the heated platens under pressure.

The bottom member 30 provides a closure at 52 for a cylinder 54 formed in a boss 56 of the main member 32. The boss 56 also contains a passage 58 leading from the cylinder into the cavity 50 in the molding material in the flask. A plunger 60 is located in a corresponding guide hole in the upper platen 22, as clearly shown in Fig. 1, and this plunger is screw threaded as at 62 and is provided with a hand wheel 64. When the operator is ready to mold, a desired amount of material is placed in the cylinder 54 and then the hand wheel is rotated in a direction to cause the plunger 60 to descend in the cylinder, exerting a great pressure on the molding material, which, being now heated, is forced toward the cavity 50 placing all of the molding material in the cavity under pressure which is equal at all parts of the cavity. After a few moments the plastic molding material hardens and sets, whereupon no further pressure is enabled to be exerted but due to the exertion of the pressure the plate formed in the cavity 50 will be absolutely non-porous, hard, and non-warping when it is taken out of the flask. There are no bubbles in it and within ten minutes from the time of exerting the pressure on the molding material in the cylinder, the press may be opened and the flask removed, and after cooling and a little polishing it is ready for use. It will be well recognized by those skilled in the art that this is extremely different from the normal curing operation requiring five hours.

Figure 3:
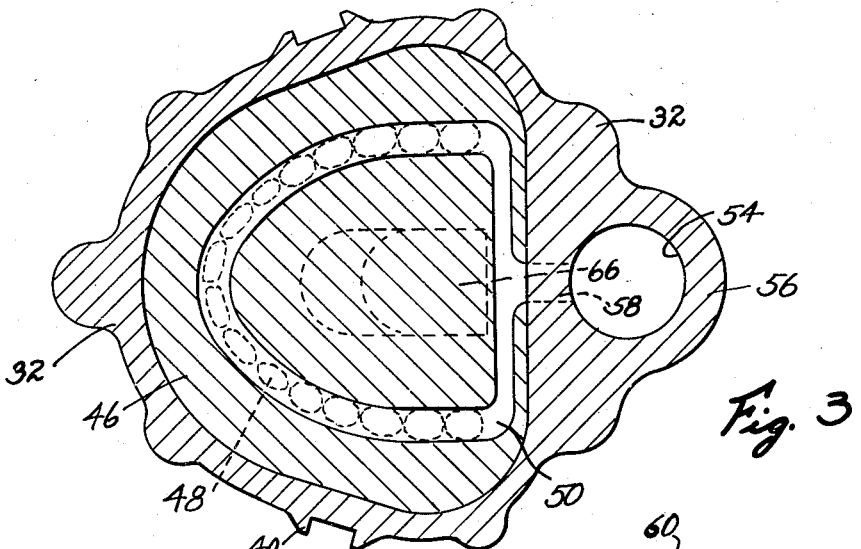
Fig. 3 is an enlarged horizontal section through the flask.
Figure 5:
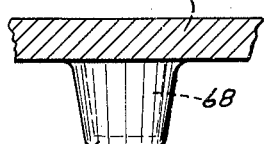
Fig. 5 is a detail of the top flask member, illustrating the thermoduct.

The upper plate or top cover 34 is provided with what is termed a thermoduct 66, this comprising a solid or hollow boss of material extending down from the plate 34 and having an outline conforming in general to the outline of the dental plate, as clearly shown in Fig. 3, and having a depth approaching the cavity 50 so that heat will be conducted from the platen 22 evenly to the molding cavity as well as from the platen 14 upwardly so that the heat applied to the cavity and the molding material is substantially even throughout the area where the molding is taking place. The thermoduct 66 may be solid or it may be provided with an enlarged cavity shown in dotted lines in Fig. 5 at 68, to reduce weight.

Having thus described my invention and the advantages thereof, I do not wish to be limited to the details herein disclosed otherwise than as set forth in the claim, but what I claim is:

Apparatus for making dental plates of moldable plastic material comprising a flask, a boss thereon, a cylinder in the boss, a passage from the bottom of the cylinder to the flask interior, a heated platen, a plunger secured in the platen and having a cylindrical end for traverse in the cylinder, a supporting platen, and means alining the platens and flask to aline the plunger with the cylinder, whereby moldable plastic may be inserted in the cylinder and forced under pressure into the flask by the plunger.

ARCHIE J. DESNOYERS.

REFERENCES CITED

The following references are of record in the file of this patent:

UNITED STATES PATENTS

| Number | Name | Date |
|---|---|---|
| 1,353,942 | Akin | Sept. 28, 1920 |
| 1,541,869 | Sprenger | June 16, 1925 |
| 1,941,780 | Angell | Jan. 2, 1934 |
| 1,952,951 | Stehley | Mar. 27, 1934 |
| 2,192,902 | Erdle | Mar. 12, 1940 |
| 2,279,952 | Pryor | Apr. 14, 1942 |
| 2,392,929 | Lee | Jan. 15, 1946 |